(12) United States Patent
Bresler

(10) Patent No.: US 10,709,069 B2
(45) Date of Patent: Jul. 14, 2020

(54) SILO FOR GRAIN

(71) Applicant: Casparus Bresler, Farm Vredehoek (ZA)

(72) Inventor: Casparus Bresler, Farm Vredehoek (ZA)

(73) Assignee: Casparus Bresler, Farm Vredehoek (ZA)

( * ) Notice: Subject to any disclaimer, the term of this patent is extended or adjusted under 35 U.S.C. 154(b) by 54 days.

(21) Appl. No.: 15/766,902

(22) PCT Filed: Oct. 5, 2016

(86) PCT No.: PCT/IB2016/055947
§ 371 (c)(1),
(2) Date: Apr. 9, 2018

(87) PCT Pub. No.: WO2017/060823
PCT Pub. Date: Apr. 13, 2017

(65) Prior Publication Data
US 2018/0288941 A1    Oct. 11, 2018

(30) Foreign Application Priority Data

Oct. 9, 2015   (ZA) ................................ 2015/07538
Feb. 8, 2016   (ZA) ................................ 2016/00874

(51) Int. Cl.
*F26B 5/04*   (2006.01)
*A01F 25/14*   (2006.01)
(Continued)

(52) U.S. Cl.
CPC .............. *A01F 25/14* (2013.01); *A01F 25/22* (2013.01); *F26B 9/006* (2013.01); *F26B 21/004* (2013.01);
(Continued)

(58) Field of Classification Search
None
See application file for complete search history.

(56) References Cited

U.S. PATENT DOCUMENTS 3,280,473 A * 10/1966 Sullivan ................. F26B 9/006
                                                          34/412
4,521,517 A   6/1985 Gauthier
(Continued)

FOREIGN PATENT DOCUMENTS

DE         29500726 U1    3/1995
WO      2012/160451 A1   11/2012

OTHER PUBLICATIONS

International Search Report for International Application No. PCT/IB2016/055947, dated Mar. 23, 2017, European Searching Authority, European Patent Office.
(Continued)

*Primary Examiner* — Jason Lau
(74) *Attorney, Agent, or Firm* — Cozen O'Connor

(57) ABSTRACT

According to one aspect of the invention there is provided a method of drying a body of grain, comprising storing the body of grain in an elongate bag silo 10, providing at least a first outlet 22 intermediate a first end 16 and a second end 18 of the bag and at least a first and a second inlet (26, 28), situated intermediate the outlet 22 and the first end 16 of the bag. The second inlet 28 is spaced longitudinally further away from the first outlet 22 than the first inlet 26 and the first outlet 22 is the closest outlet to the second inlet 28 in a direction towards the second end 18 of the bag 10. The method further comprises providing a flow of air, between the inlets and the outlet such that a pressure differential between any of the inlets is maintained within a predetermined threshold.

17 Claims, 7 Drawing Sheets

(51) Int. Cl.
  *A01F 25/22* (2006.01)
  *F26B 9/00* (2006.01)
  *F26B 21/00* (2006.01)

(52) U.S. Cl.
  CPC .. *A01F 2025/145* (2013.01); *B65D 2575/583* (2013.01); *F26B 2200/06* (2013.01)

(56) References Cited

U.S. PATENT DOCUMENTS

| | | | | |
|---|---|---|---|---|
| 5,116,760 A | * | 5/1992 | Tanaka | C05F 17/0247 435/290.1 |
| 5,178,491 A | * | 1/1993 | Graves | B09C 1/10 166/246 |
| 5,461,843 A | * | 10/1995 | Garvin | A01F 25/14 53/434 |
| 6,911,340 B1 | | 6/2005 | Cullen | |
| 8,048,668 B1 | * | 11/2011 | Mathsen | C05F 17/0258 210/610 |
| 2008/0064087 A1 | * | 3/2008 | O'Neill | C05F 17/0258 435/290.1 |
| 2014/0223764 A1 | * | 8/2014 | Swart | F26B 9/006 34/443 |

OTHER PUBLICATIONS

Written Opinion for International Application No. PCT/IB2016/055947, dated Mar. 23, 2017, European Searching Authority, European Patent Office.

\* cited by examiner

SILO FOR GRAIN

CROSS REFERENCE TO RELATED APPLICATIONS

This application is a National Phase under 35 U.S.C. 371 of International Application No. PCT/IB16/055947, filed Oct. 5, 2016, which claims the benefit of South African application nos. 2015/07538, filed Oct. 9, 2015, and 2016/00874, filed Feb. 8, 2016, both of which are incorporated herein by reference in their entireties.

INTRODUCTION AND BACKGROUND

This invention relates to grain silos and more particularly to bag silos adapted to dry grain stored in the bag silo.

It will be understood that the term "bag silo" refers to a conventional and known bag silo that comprises an elongate flexible sheath of an impermeable material which is fillable with grain. It will further be appreciated that references to "grain" include any crop which may benefit from drying out, and the moisture content of which may be reduced by exposure to air flow.

Conventionally, air is heated at a heating facility and conveyed via conduits to the silo, to thereby dry the grain within the silo. The heating facility is normally spaced or remote from the silo and the air is moved to the silo under the influence of positive pressure at the heating facility. These known systems are expensive and are associated with unnecessary heat losses along the conduits extending between the heating facility and the silo. Proper control over the rate of drying throughout the whole body of grain is also not possible.

Conventional bag silos further have to be provided with excessively big suction or blower sources to ensure that sufficient air flow rates and pressures are provided to the silo, to thereby facilitate proper drying out of the grain. This negatively impacts on the overall efficiency of these conventional bag silos.

OBJECT OF THE INVENTION

Accordingly, it is an object of the present invention to provide a grain silo, a grain silo kit, a method of drying a body of grain and an air heater with which the applicant believes the aforementioned disadvantages may at least be alleviated or which will provide useful alternatives for known silos, kits, methods and air heaters.

SUMMARY OF THE INVENTION

According to a first aspect of the invention there is provided a method of drying a body of grain, the method comprising:

- storing the body of grain in an elongate bag silo comprising at least one wall of an impermeable material, a first end and a second end;
- providing at least a first arrangement of ports for air in the bag, the first arrangement comprising:
  - at least a first outlet for air from the bag, the first outlet being situated intermediate the first end and the second end of the bag;
  - at least a first set of inlets for air into the bag, the first set of inlets being situated intermediate the first outlet and the first end of the bag, the first set of inlets comprising at least a first inlet which is spaced a first distance from the first outlet and a second inlet which is spaced a second distance from the first inlet and longitudinally further away from the first outlet than the first inlet, and wherein the first outlet is the closest outlet to the second inlet in a direction towards the second end of the bag; and
- providing a flow of air in the bag, between the at least first and second inlets and the first outlet such that a pressure differential between any two of said at least first and second inlets is maintained within a predetermined threshold.

The pressure may be maintained within the predetermined threshold by spacing the at least first and second inlets such that the magnitude of the first distance exceeds that of the second distance.

The first set of inlets may further comprise a third inlet spaced a third distance from the second inlet and a fourth inlet spaced a fourth distance from the third inlet. The magnitude of the second distance may exceed that of the third distance, and the magnitude of the third distance may exceed that of the fourth distance.

The first set of inlets may alternatively comprise a third inlet spaced a third distance from the second inlet and a fourth inlet spaced a fourth distance from the third inlet. The pressure differential may be maintained by spacing the inlets such that the magnitude of both the first and second distances are equal and the magnitude of both the third and fourth distances equals half of the magnitude of the both the first and second distances.

Alternatively, the pressure differential may be maintained by providing at least some of the at least first and second inlets with a pressure regulating device.

The first arrangement of ports for air in the bag may further comprise a second set of inlets for air into the bag, the second set of inlets may be a mirror image of the first set of inlets about a transverse line through the first outlet.

At least a second arrangement of ports may be provided in the bag. The second arrangement may be a duplicate of the first arrangement and may be spaced intermediate the first arrangement and the second end of the bag.

Each outlet may comprise two laterally spaced outlet ports. Each of said laterally spaced outlet ports may be provided with a perforated outlet duct extending through the outlet port into the bag. Furthermore, each inlet may comprise two laterally spaced inlet ports. Each of said laterally spaced inlet ports may be provided with a perforated inlet duct extending through the inlet port into the bag.

A flow of air may be provided in the bag by providing an air pump in fluid flow communication with at least some of the inlets. Alternatively, the flow of air may be provided in the bag by providing an air pump in fluid flow communication with at least some of the outlets.

The air entering the bag may be heated by at least one of a solar heat collector, a heat exchanger and a heater energized by an electrical power source.

According to a second aspect of the invention there is provided a silo for drying a body of grain, the silo comprising:

- an elongate bag comprising at least one wall of an impermeable material, a first end and a second end;
- at least a first arrangement of ports for air in the bag, the first arrangement comprising:
  - at least a first outlet for air from the bag, the first outlet being situated intermediate the first end and the second end of the bag; and
  - at least a first set of inlets for air into the bag, the first set of inlets being situated intermediate the first outlet and the first end of the bag, the first set of inlets comprising at least a first inlet which is spaced a first distance from the first outlet and a second inlet which is spaced a second distance from the first inlet and longitudinally further away from the first outlet than the first inlet, and wherein the first outlet is the closest outlet to the second inlet in a direction towards the second end of the bag.

The configuration of ports may be such that when a flow of air is provided between the at least first and second inlets and the first outlet, a pressure differential between any of the said at least first and second inlets is maintained within a predetermined threshold.

The at least first and second inlets may be spaced such that the magnitude of the first distance exceeds that of the second distance. Furthermore, the first set of inlets may comprise a third inlet spaced a third distance from the second inlet and a fourth inlet spaced a fourth distance from the third inlet. The magnitude of the second distance may exceed that of the third distance, and the magnitude of the third distance may exceed that of the fourth distance.

Alternatively, the first set of inlets may comprise a third inlet spaced a third distance from the second inlet and a fourth inlet spaced a fourth distance from the third inlet. The inlets may be spaced such that the magnitude of both the first and second distances are equal and the magnitude of both the third and fourth distances equals half that of the magnitude of the first and second distances.

Alternatively, at least some of the at least first and second inlets may be provided with a pressure regulating device.

The first arrangement of ports for air in the bag may further comprise a second set of inlets for air into the bag. The second set of inlets may be a mirror image of the first set of inlets about a transverse line through the first outlet.

At least a second arrangement of ports may be provided in the bag. The at least second arrangement may be situated intermediate the first arrangement and the second end of the bag.

Each outlet may comprise two laterally spaced outlet ports. Each of said laterally spaced outlet ports may be provided with a perforated outlet duct extending through the outlet port into the bag. Furthermore, each inlet may comprise two laterally spaced inlet ports. Each of said laterally spaced inlet ports may be provided with a perforated inlet duct extending through the inlet port into the bag.

A flow of air may be provided in the bag by an air pump in fluid flow communication with at least some of the inlets. Alternatively the flow of air may be provided in the bag by an air pump in fluid flow communication with at least some of the outlets.

Each inlet may further comprise at least one of a solar heat collector, a heat exchanger and a heater energized by an electrical power source.

According to a third aspect of the invention there is provided a kit for drying a body of grain stored in a bag silo, the kit comprising at least the following components:
 a plurality of perforated inlet ducts for air into the bag;
 a plurality of perforated outlet ducts for air from the bag;
 a plurality of air heaters for heating air entering the bag;
 an air pump; and
 flexible piping for conveying air from one of a) at least some of the plurality of perforated outlet ducts to the air pump, and b) the air pump to at least some of the perforated inlet ducts.

The plurality of air heaters may comprise at least one of a plurality of solar collectors and a plurality of electric air heating elements.

The components of the kit may further comprise a hammer for use in inserting the perforated ducts into the body of grain, and a power generator for supplying electrical power to at least one of a) the electrical heaters and b) the air pump.

At least some of the components of the kit may be stored in a trailer.

According to a fourth aspect of the invention there is provided an air heater for a bag silo, the air heater comprising:
 at least a first solar collector, comprising:
  a body having at least one translucent wall;
  a heat absorbing medium;
  a first chamber for air defined between the translucent wall and the heat absorbing medium;
  the body defining at least one collector inlet for air into the first chamber; and
  the body defining a collector outlet for air from the first chamber and which collector outlet may be brought in fluid flow communication with an inlet for air of the silo.

The at least first solar collector may further comprise a second chamber for air defined between the heat absorbing medium and the collector outlet. The first and second chambers may be arranged in fluid flow communication.

The air heater may comprise a second solar collector. The first and second solar collectors may be mounted on a flexible carrier, which may in use be mountable on the bag so that the first and second solar collectors are spaced laterally on the bag.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
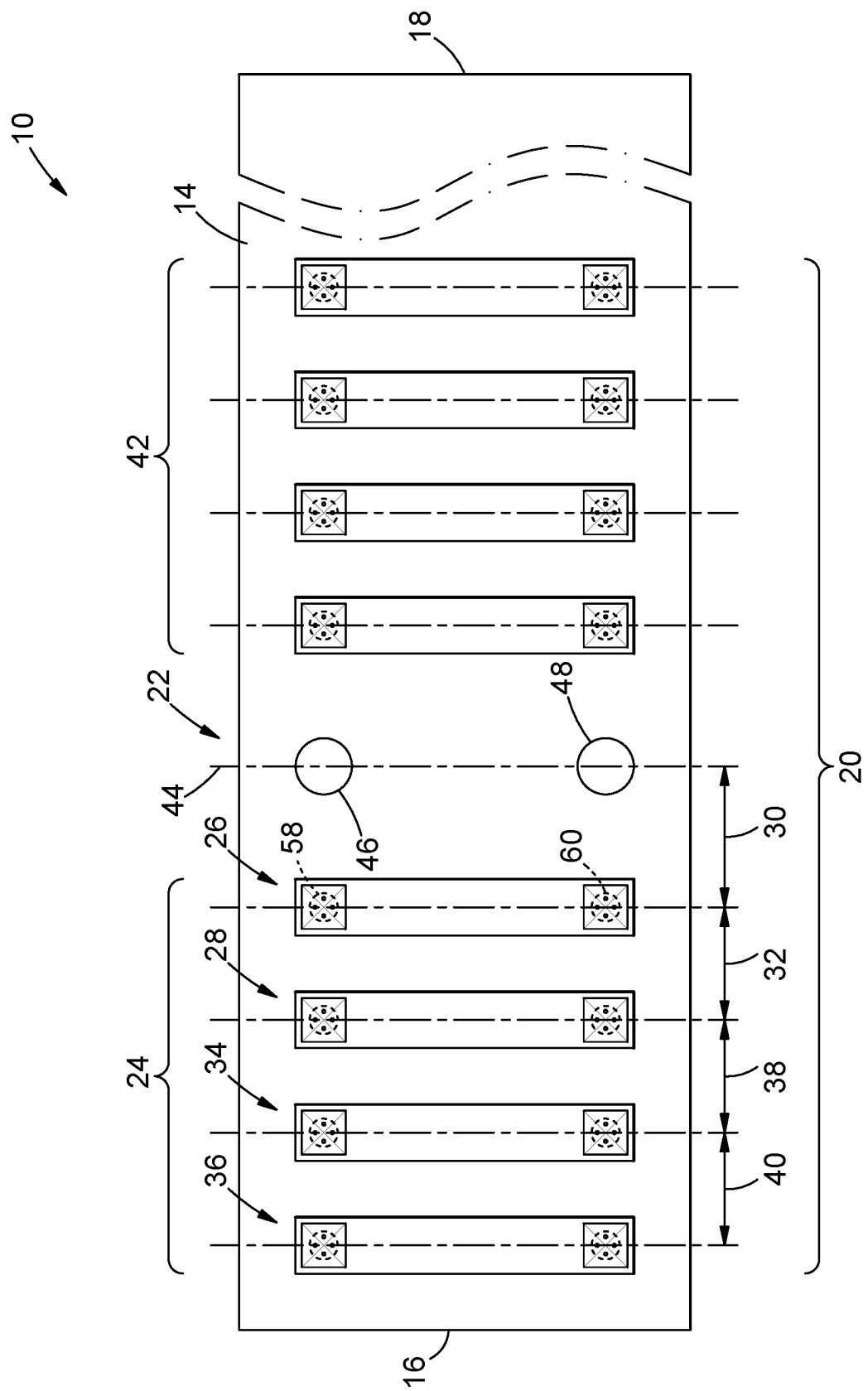
FIG. 1 is a diagrammatic plan view of a bag silo according to a first example embodiment of the invention.

A bag silo according to an example embodiment of the invention is typically indicated with reference numeral 10 in the figures. The bag silo 10 is typically used to store a body of grain 12. The bag silo 10 is used in a method for drying the body of grain 12.

The method of drying the body of grain 12 comprises storing the body of grain 12 in the elongate bag silo 10. The elongate bag silo 10 comprises at least one wall of an impermeable material 14, a first end 16 and a second end 18.

The method further comprises providing at least a first arrangement of ports 20 in the bag. The first arrangement of ports 20 comprises at least a first outlet 22 for air from the bag, the first outlet 22 being situated intermediate the first end 16 and the second end 18 of the bag 10.

The first arrangement 20 further comprises at least a first set of inlets 24 for air into the bag, the first set of inlets 24 being situated intermediate the first outlet 22 and the first end 16 of the bag 10. The first set of inlets 24 comprises at least a first inlet 26 and a second inlet 28. The first inlet is spaced a first distance 30 from the first outlet 22 and the second inlet 28 is spaced a second distance 32 from the first inlet 26. The second inlet 28 is spaced longitudinally further away from the first outlet 22 than the first inlet 26. The first outlet 22 is the closest outlet to the second inlet 28 in a direction towards the second end 18 of the bag 10.

The method further comprises providing a flow of air in the bag 10, between the at least first and second inlets (26, 28) and the first outlet 22. The flow in the bag 10 is provided such that a pressure differential between any two of said at least first and second inlets (26, 28) is maintained within a predetermined threshold.

The flow of air in the bag 10 facilitates the drying of the body of grain 12.

The first set of inlets 24 further comprises a third inlet 34 and a fourth inlet 36. The third inlet 34 is spaced a third distance 38 from the second inlet 28 and the fourth inlet 36 is spaced a fourth distance 40 from the third inlet 34. The third inlet 34 is spaced longitudinally further away from the first outlet 22 than the second inlet 28, and the fourth inlet 36 is spaced longitudinally further away from the first outlet 22 than the third inlet 34. In the current example embodiment, the first outlet 22 is the closest outlet to the fourth inlet 36 in a direction towards the second end 18 of the bag 10. In general, the first set of inlets 24 may comprise n inlets, with the $n^{th}$ inlet being spaced longitudinally further away from the outlet 22 than any other inlet of the first set of inlets 24. The first outlet 22 may be the closest outlet to the $n^{th}$ inlet in a direction towards the second end 18 of the bag 10.

The first arrangement of ports for air 20 further comprises a second set of inlets 42 for air into the bag. The second set of inlets 42 may be a mirror image of the first set of inlets 24 about a transverse line 44 through the first outlet 22.

Figure 2:
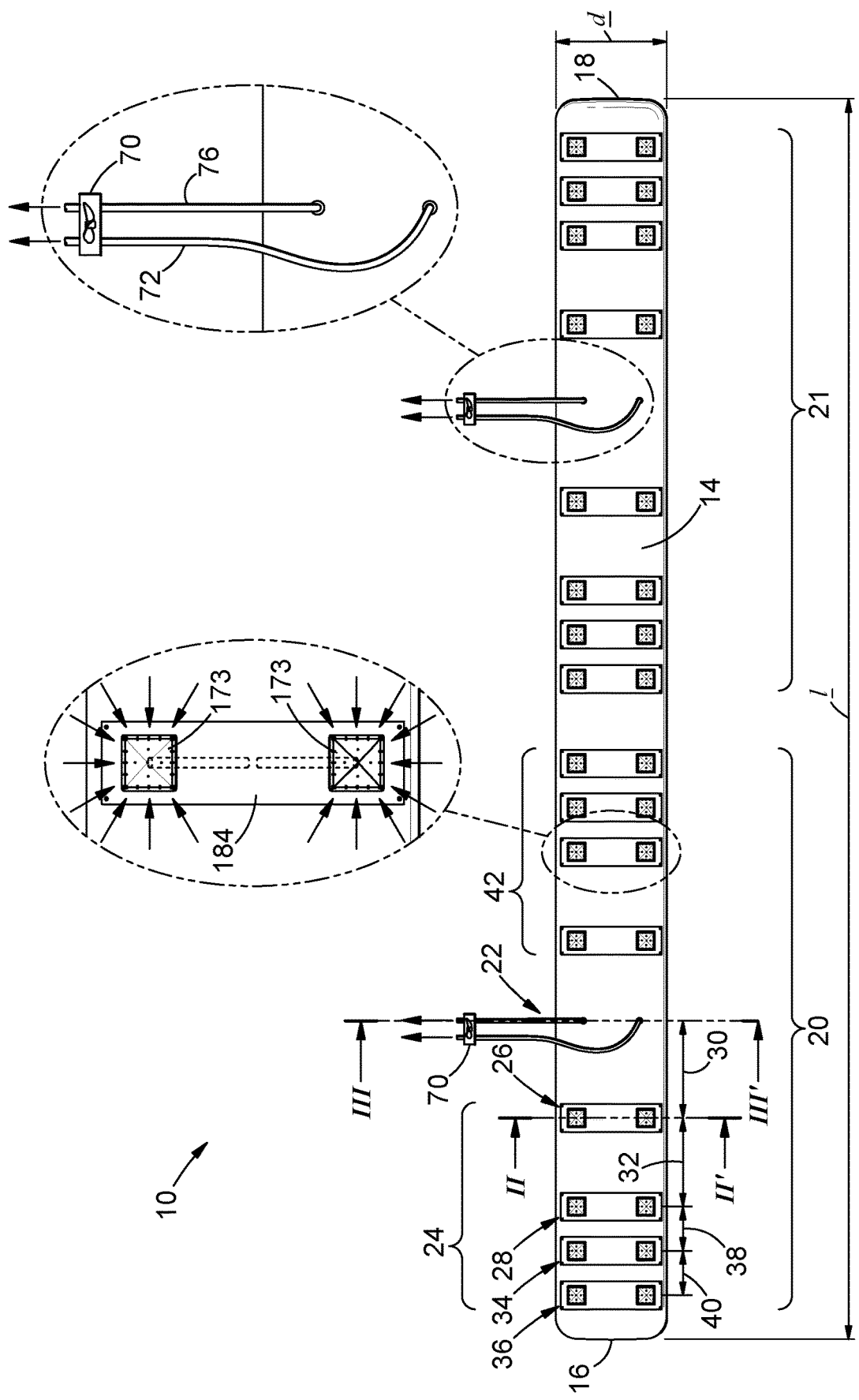
FIG. 2 is a diagrammatic plan view of a bag silo according to a second example embodiment of the invention.

A single bag silo 10 may be provided with a second arrangement of ports 21, as shown in FIG. 2. Here the bag silo 10 has a length l of 60 meter. Other standard lengths (not shown) may include bags having length l of 75 meter and 100 meter. It is foreseen that further arrangements may be provided in the bag such that a single arrangement 20 may not span a length of more than 40 meters. The bag has a transverse extent d of about 2 meter to 3.5 meter when the bag is filled with a body of grain 12.

Figure 4:
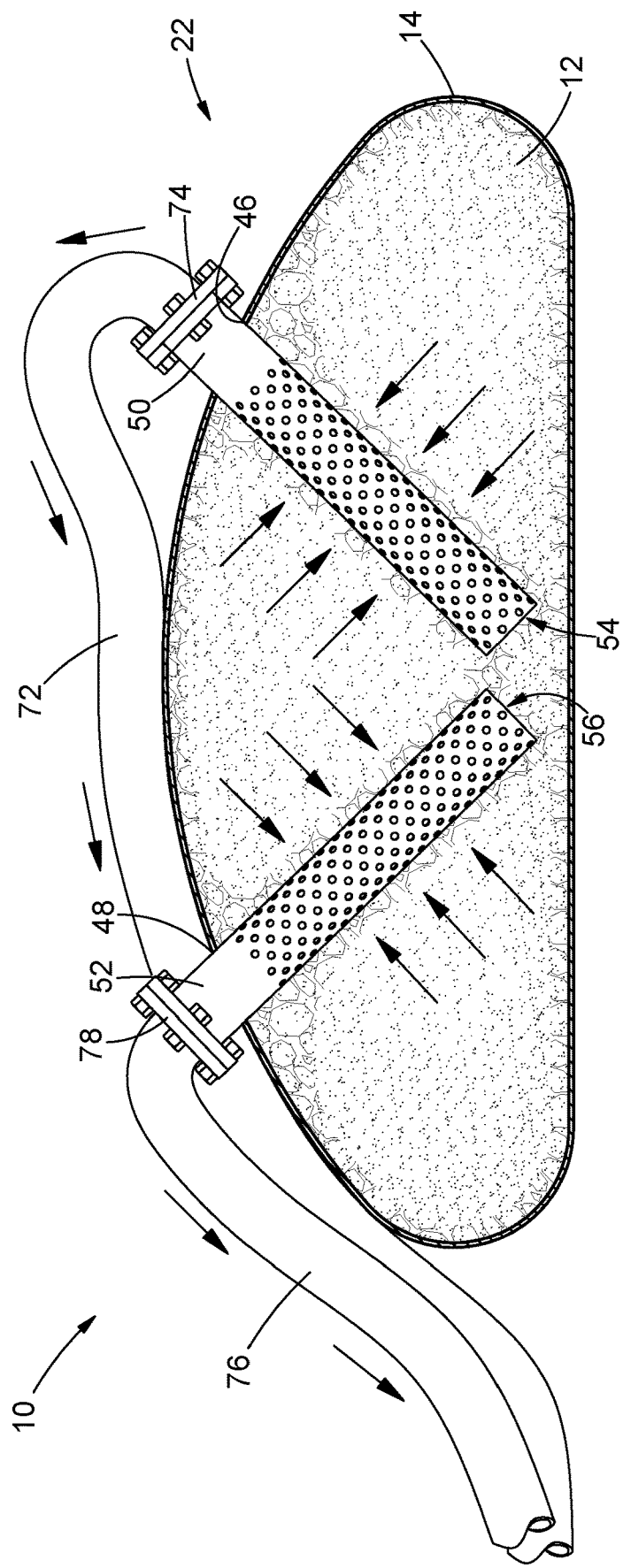
FIG. 4 is a section on line III-III' in FIG. 2.

Referring to FIG. 4, the first outlet 22 of the first arrangement 20 comprises two ports (46, 48) for air from the bag, the ports (46, 48) being laterally spaced in the bag 10. Each of ports 46 and 48 of outlet 22 is provided with a perforated outlet duct (50, 52). The perforated ducts 50 and 52 extend through ports 46 and 48 respectively and into the bag 10 and the body of grain 12. The outlets of the second and all further arrangements are similar to outlet 22 and comprise perforated outlet ducts similar to ducts 50 and 52.

Figure 3:
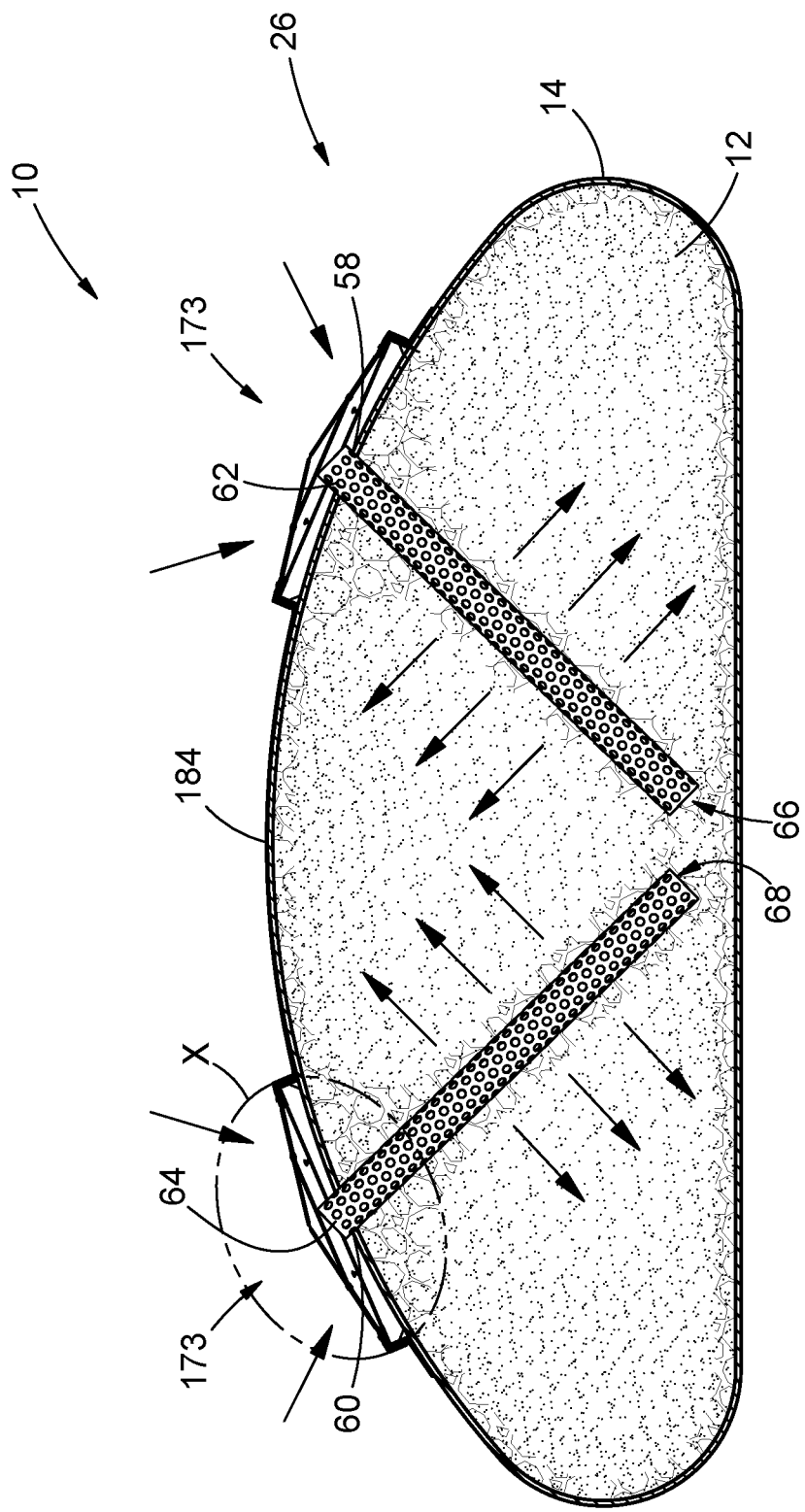
FIG. 3 is a section on line II-II' in FIG. 2.

Referring to FIG. 3, the first inlet 26 of the first set of inlets 24 of the first arrangement 20 comprises two ports (58, 60) for air into the bag, the ports (58, 60) being laterally spaced in the bag 10. Each of ports 58 and 60 of inlet 26 is provided with a perforated inlet duct (62, 64). The perforated ducts 62 and 64 extend through ports 58 and 60 respectively and into the bag 10 and the body of grain 12. All of the inlets in the bag are similar to inlet 26 and comprise perforated outlet ducts similar to ducts 62 and 64.

The distal ends 54 and 56 of the perforated outlet ducts 50 and 52, as well as the distal ends 66 and 68 of the perforated inlet ducts 62 and 64 are open. In use, the body of grain 12 is stored in the bag silo 10 before the perforated inlet and outlet ducts are inserted into the ports. The distal ends of the inlet and outlet ducts are open to ease the insertion of the ducts into the body of grain 12. Alternatively, the distal ends may be cone shaped (not shown) for the same reason.

Since the first arrangement 20 and all further arrangements comprise a single outlet 22 and two sets of inlets, the diameters of the outlet ducts 50 and 52 exceed the diameters of the inlets ducts 62 and 64. Typically, the outlet ducts 50 and 52 have a diameter of between 100 millimeter and 200 millimeter, and more particularly, 140 millimeter, while the inlet ducts 62 and 64 have a diameter of between 25 millimeter and 75 millimeter, and more particularly 50 millimeter.

The significance of maintaining the pressure within the predetermined threshold becomes apparent when considering the flow of air through the bag 10. Since each outlet is associated with more than one inlet, it is important to regulate the flow of air into each inlet in order to ensure that a suitable average moisture content of grain in the bag is achieved. Had the first distance 30, second distance 32, third distance 38 and fourth distance 40 been equal in FIG. 1, without any means for regulating the pressure in each inlet being provided and since the density of the grain in the bag remains relatively constant along the length of the bag, the resistance against the flow of air between the fourth inlet 36 and the outlet 22 would naturally be higher than the resistance against the flow of air between the first inlet 26 and the outlet 22. Consequently, the drying out of the grain 12 in the bag 10 in an area towards the first inlet 26 would occur more rapidly than that of the grain 12 in an area toward the fourth inlet 36. This would lead to grain that is too dry in one area of the bag and grain that is too moist in others. By maintaining the pressure at each inlet within the predetermined threshold, the aforementioned problem is overcome.

One of the variables that is limited by practicality is the size of the air pump that is used to supply a flow of air to the bag silo 10. In order to reach the objective of drying the body of grain in a financially feasible manner, the size and the number of air pumps used should be limited. The current invention thus overcomes this limitation, while ensuring that a suitable average moisture content within the body of grain 12 is achieved, by ensuring that the pressure differential between any of the inlets, and therefore the difference in flow rates of air into any of the inlets, remain within a predetermined threshold.

Generally, the predetermined threshold is preferably not larger than 20%, more preferably not larger than 10% and most preferably as close to zero as possible. It is further foreseen that the predetermined threshold may be adjusted in particular instances to meet a specific demand in terms of a localized drying rate of the grain.

Referring to FIG. 1, and according to a first example, the pressure differential is maintained within the predetermined threshold by spacing the inlets constituting the first set of inlets 24 such that the magnitude of the first distance 30 exceeds the magnitude of the second distance 32, the magnitude of the second distance 32 exceeds the magnitude of the third distance 38 and the magnitude of the third distance 38 exceeds the magnitude of the fourth distance 40.

Still referring to FIG. 1, alternatively, and in a second example, the pressure is maintained within the predetermined threshold by providing each of the inlets constituting the first set of inlets 24 with a pressure regulating device. Now the magnitude of the first distance 30, second distance 32, third distance 38 and fourth distance 40 is no longer critical and may be selected arbitrarily, or may even be equal. It will be appreciated that a combination of spacing and pressure regulating devices may be used.

Each pressure regulating device may comprise an orifice plate or a valve. Typically, when using valves as pressure regulating devices, the openings of the valves provided in the fourth inlet 36 will be larger than those of the third inlet 34, the openings of the valves provided in the third inlet 34 will be larger than those of the second inlet 28, and the openings of the valves provided in the second inlet 28 will be larger than those of the first inlet 26. Pressure gauges may be provided at each inlet to assist in setting up the pressure regulating devices.

Alternatively, orifice plates having similar openings than the valves as disclosed above may be used. When using orifice plates as pressure regulating devices however, the spacings between the inlets will have to be predetermined while taking the specifications of the orifice plates into consideration.

Referring to FIG. 2, and according to a third example, the magnitude of both the first distance 30 and the second distance 32 is b, while the magnitude of both the third distance 38 and the fourth distance 40 is b/2. The magnitude b may range between 3 meters and 6 meters, and may particularly be 4 meters. This configuration has experimentally been proven to provide an adequate pressure differential and therefore an adequate flow rate of air into each inlet to result in a suitable average drying rate of the grain and consequently, a suitable average moisture content in the bag, while remaining financially feasible.

It should be noted that the magnitude of b may vary depending on the type of grain stored in the bag 10. As an example, the particles of maize are larger than those of wheat. Thus, when maize is stored in the bag, the resistance against the flow of air through the maize will be lower than when wheat is stored in the bag. Therefore, the magnitude of b may be increased when storing maize in the bag, or may be decreased when storing wheat in the bag.

The spacings as described in each of the examples above apply in each case equally to the second set of inlets 42 of the first arrangement 20, and to the further arrangements that may be provided in the bag 10.

The flow of air is provided by an air pump. As shown in FIG. 2, a suction pump 70 is provided in fluid flow communication with the first outlet 22. As best shown in FIG. 4, a first flexible outlet pipe 72 is connected via a first flange 74 to outlet duct 50, while a second flexible pipe 76 is connected via a second flange 78 to outlet duct 52. The first and second flanges (74, 78) may be replaced by suitable alternative fixing devices or means. Particularly, the flexible pipes (72, 76) may fit snugly over the respective outlet ducts and be further secured by suction. The flexible pipes 72 and 76 are connected to the suction pump 70. The total power consumption of the suction pump 70 in the current configuration is 2.2 kW. Alternatively, two separate suction pumps (not shown) may be provided, one for each of the first flexible outlet pipe 72 and the second flexible outlet pipe 76 respectively. Each of the two separate suction pumps may have a power consumption of 1.1 kW. In use, the suction pump causes a negative pressure of about 1500 Pa in the bag. The suction pump 70 may be a centrifugal radial bladed fan that can provide a maximum negative pressure of 1800 Pa. Since the distal ends (54, 56) of the outlet ducts are open, some particles may be sucked into the suction pump 70. The suction pump 70 is specifically selected to be able to withstand such particles being sucked into it.

In an alternative embodiment (not shown), a blower may be used instead of suction pump 70. The blower may be connected via a manifold to all of the inlets of both the first set of inlets 24 and the second set of inlets 42. Alternatively, two separate blowers may be provided, each with a manifold connected to all of the inlets of either the first set of inlets 24 or the second set of inlets 42.

In use, a single suction pump 70 (or pair of smaller suction pumps) may be connected to the first arrangement 20, while no suction pump is connected to the second and further arrangements provided in the bag. The suction pump may then be used to provide a flow of air in the first arrangement until the average moisture content of the body of grain within the bag in an area towards the first arrangement reaches an acceptable level. Thereafter, the suction pump 70 (or pair of smaller suction pumps) may be disconnected from the first arrangement 20, and connected to the second arrangement 21 or further arrangements. The method thus leans itself towards drying certain parts of the body of grain 12 stored in the bag 10 before others. This may become especially useful when only a single suction pump 70 is available, when a power supply in the vicinity of the bag silo is limited, or where the silo is unloaded at specific intervals and the average moisture content of the grain stored towards a specific end of the bag silo 10 needs to be within a specific range to enable that portion of the body of grain to be unloaded from the bag silo 10.

If the aforementioned limitations are not present, each arrangement may be provided with its own air pump and the whole of the body of grain 12 stored within the bag silo 10 may be dried simultaneously.

From a practical point of view, the moisture content of the air in the bag may become saturated which may impact negatively on the rate of drying out the body of grain 12. For this and other reasons, the air entering the bag 10 may be heated by means of an air heater.

Figure 5:
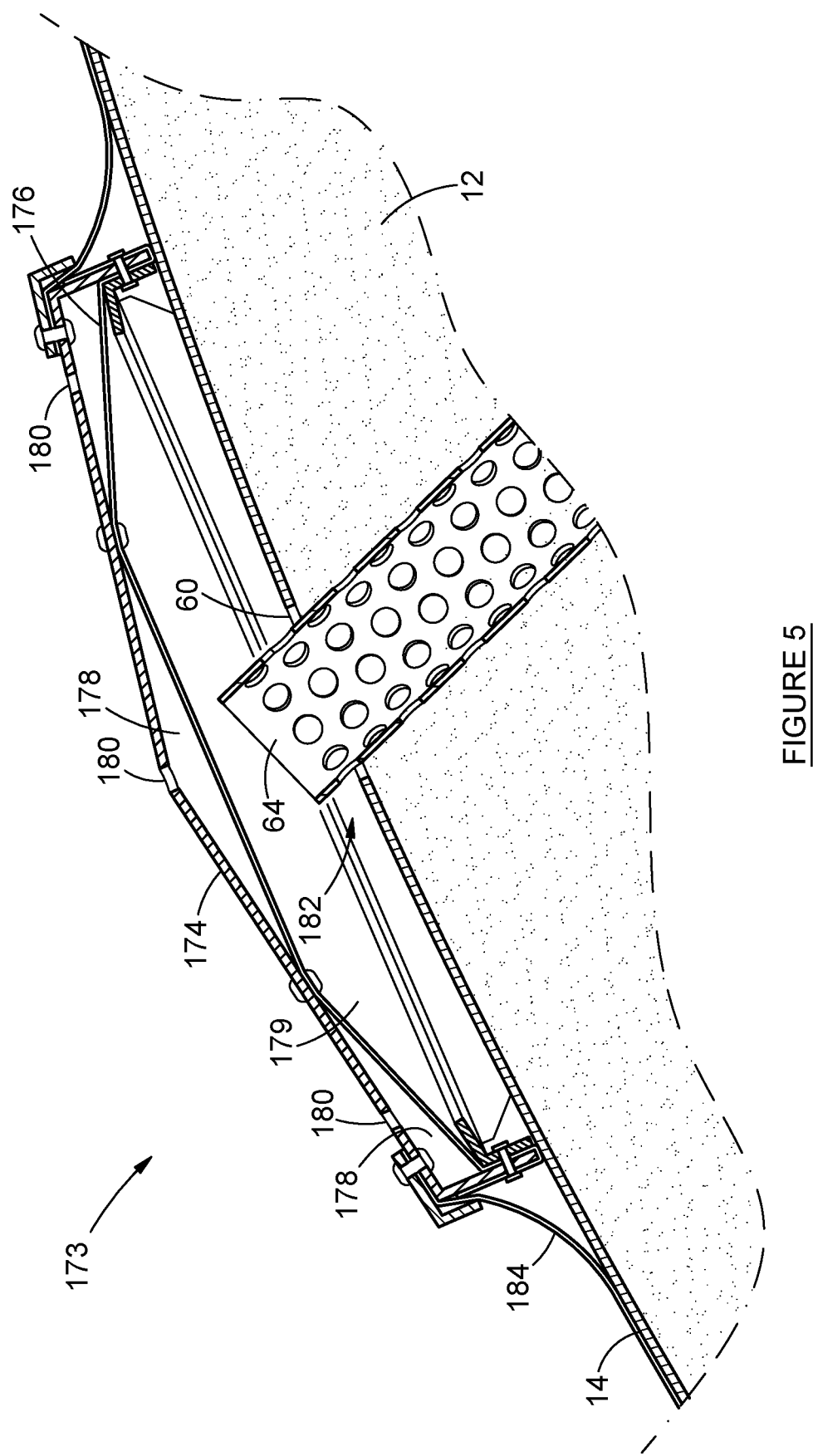
FIG. 5 is an enlarged detail view of X indicated in FIG. 2.
Figure 6:
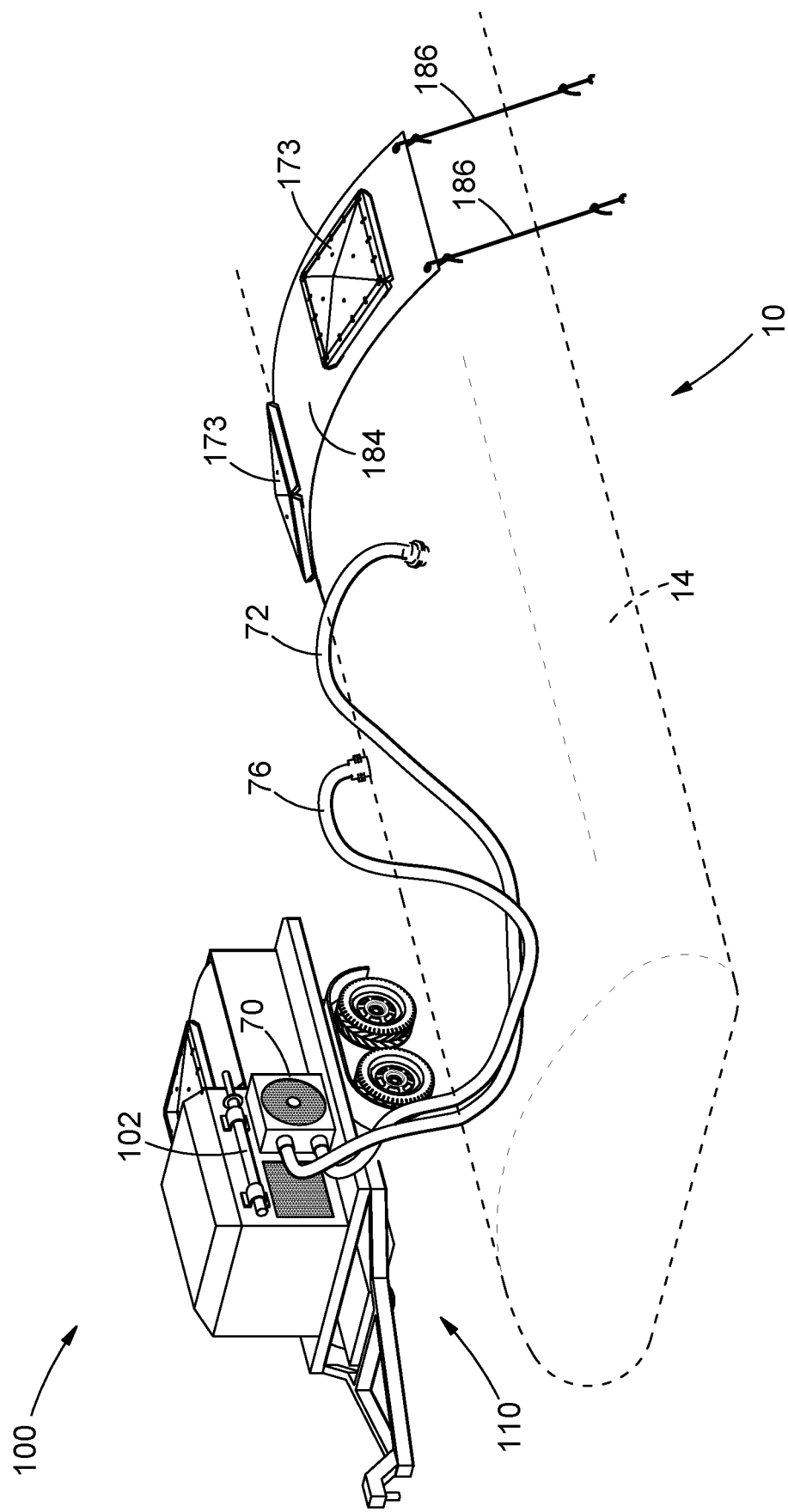
FIG. 6 is an isometric view of an example embodiment of a kit used in conjunction with the bag silo of FIG. 1.

An example embodiment of an air heater comprising at least one solar collector 173 is shown in FIGS. 5 and 6. The solar collector comprises a body having at least one translucent wall 174 and a heat absorbing medium 176 located within the body. The heat absorbing medium 176 comprises a perforated sheet. A first chamber 178 for air is defined between the translucent wall 174 and the heat absorbing medium 176. At least one collector inlet 180 for air into the first chamber is defined within the body. In the current example, seventeen collector inlets 180 are defined within the body. The solar heat collector 173 further comprises an outlet 182 which is in fluid flow communication with an inlet for air of the bag silo 10, such as inlet port 60. In FIG. 5 it can be seen that the body of the solar collector 173 is open ended to form outlet 182 which is in fluid flow communication with inlet port 60 and duct 64.

Still referring to FIG. 5, in use, air is sucked into the first chamber 178 through the collector inlets 180. Here heat is transferred from the perforated sheet 176 to the air in the first chamber 178. The heated air moves through the perforated sheet and through the outlet 182, inlet port 60 and into inlet duct 64, through which it enters the bag.

It should be borne in mind that the air flow into the solar heat collector is relatively slow. The applicant has found that the solar collector is capable of increasing the air temperature entering the bag silo 10 by at least 10° C. A 10° C. increase in air entering the bag silo has been found to increase the rate of drying out the body of grain by between two and four times. Each solar collector 173 covers an area of about 0.64 $m^2$ and transfers about 600 W of heat to air passing through it.

The solar collector 173 further comprises a second chamber 179 between the absorbing medium 176 and the wall of the impermeable material 14. The inclusion of the second chamber 179 ensures that the impermeable material 14 does not overheat. Overheating of the impermeable material 14 leads to melting or unwanted stretching of the material 14.

As indicated in FIG. 6, the air heater comprises a second solar collector 173, so that a single air heater assembly may be used for each inlet comprising two inlet ducts 62 and 64. The first and second solar collectors 173 are mounted on a flexible carrier 184. In use, the flexible carrier 184 is brought to bear on the bag silo 10, so that the first and second solar collectors 173 are spaced laterally on the bag silo 10. The flexible carrier 184 keeps rain water falling on, and running down the bag 10 away from the inlet ports.

In use, the air heater is secured to the bag silo 10 by suction. Anchoring cables 186 may also be provided to better secure the air heater to the bag. The anchoring cables 186 are fixed to a surface on which the bag silo 10 is resting. Alternatively, the flexible carrier may be fixed directly to the bag by various known fastening means such as adhesive tape etc.

Alternatively or in addition, the air heater may comprise a heating element (not shown) energized by an electrical power source. The heating element may comprise an elongate body and may removably be received axially in the inlet ducts. Each heating element may have a power consumption of about 200 W.

It is further also foreseen that each inlet may be provided with both solar collectors and heating elements energized by an electrical power source.

If a blower instead of a suction pump 70 (as more fully discussed above) is utilized, the air may be heated by first passing through a heat exchanger before entering the bag 10.

The suction pump 70 and electrical heaters may be powered from an electrical grid. Alternatively, if the bag silo 10 is stored in a remote area, combustion generators or alternative energy sources such as solar panels may be used to power the suction pump 70 and electrical heaters.

Figure 7:
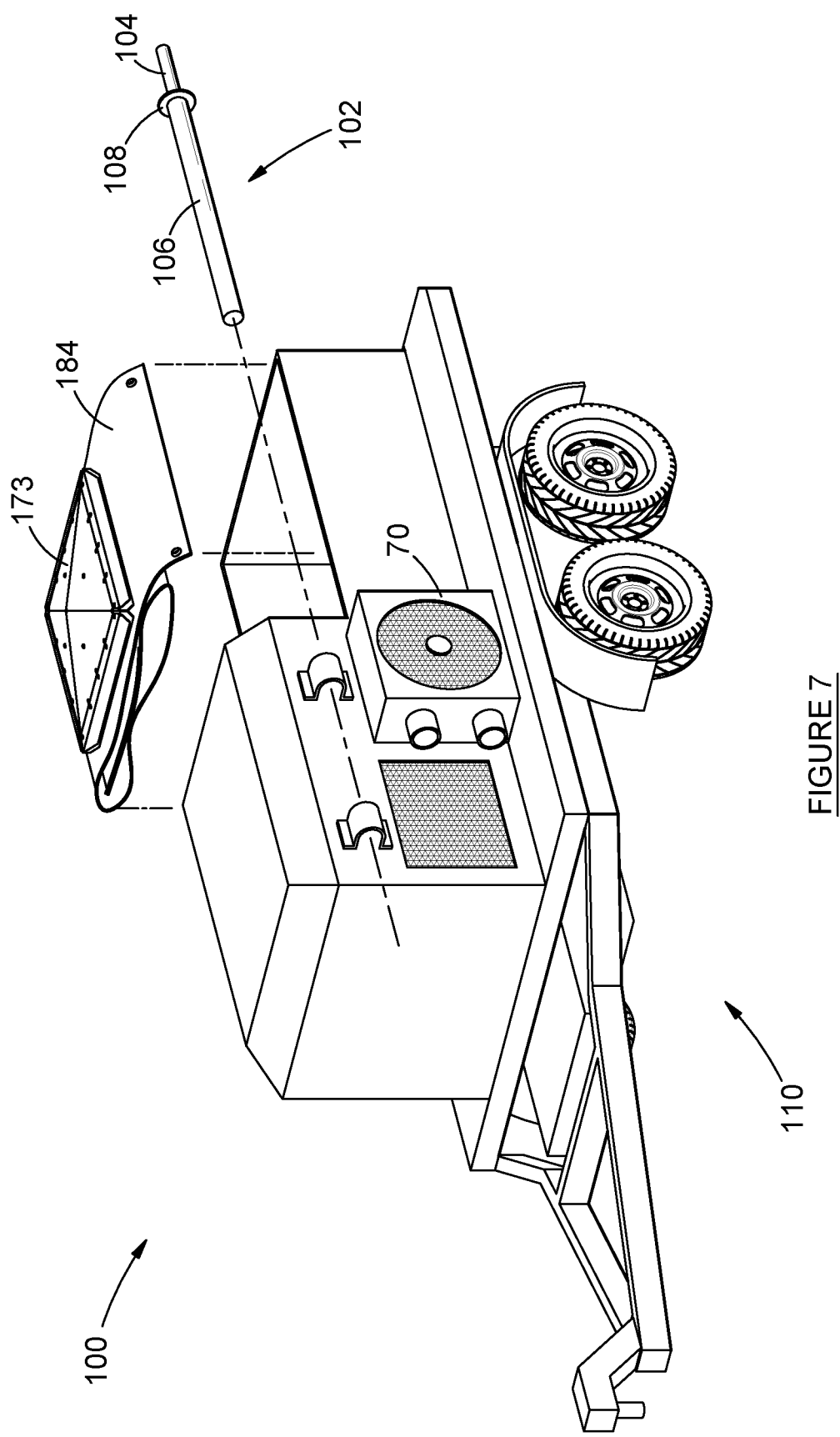
FIG. 7 is an isometric view showing further detail of the kit of FIG. 6.

There is also provided a kit comprising a number of components for use in a method of drying a body of grain stored in a bag silo. The kit is generally indicated by reference numeral 100 in FIGS. 6 and 7.

The kit 100 comprises a plurality of perforated inlet ducts (62, 64) for air into the bag, a plurality of perforated outlet ducts (50, 52) for air from the bag, a plurality of air heaters for heating air entering the bag, an air pump 70 and flexible piping (72, 76).

As discussed previously, the air heaters may comprise both solar collectors 173 and heating elements energized by electrical power. The air pump may be either a suction pump 70 or a blower and either a single air pump with an adequate capacity to provide a whole arrangement 20 with air, or two smaller air pumps may be supplied. The flexible piping (72, 76) may either convey air from the outlet 22 of the arrangement to the suction pump, or from the blower to the inlets 26, 28 of the arrangement, whichever is applicable.

The kit may further comprise hammers 102 for inserting the perforated inlet and outlet ducts into the body of grain. The hammers 102 are provided in two sizes, a first commensurate with the size of the inlet ducts, and a second commensurate with the size of the outlet ducts. The hammers 102 may comprise a cylindrical handle 104, a cylindrical body 106 and a stopper 108 in the form of a shoulder. In use, a distal ends of the duct (54, 56, 66 and 68) is inserted into the relevant port in the bag 10. The hammer is inserted into an opposing end of the duct. The size of the stopper 108 exceeds the diameter of the duct, whereas the diameter of the body 106 is slightly smaller than the diameter of the duct, so that the body may be entered into the duct with a loose fit. As duct is repeatedly struck by the hammer, stopper 108 transfers momentum from the hammer to the duct, thereby driving the duct into the body of grain. Due to the diameter of the body 106 only being slightly smaller than that of the duct, the body 106 occupies most of the open volume of the duct. This means that a very small amount of grain particles will enter the duct while being entered into the body of grain.

The kit may further comprise a diesel powered generator or alternative energy sources such as solar panels (not shown) used to supply the air pump and the heating elements with power, should a power connection to an electrical grid not be readily available.

To facilitate easy storage and transportation of the above components of the kit, the components may be stored in a trailer 110. Each trailer may comprise all components required to exercise the method as disclosed herein on a bag silo 10 filled with a body of grain 12.

It is believed that a bag silo 10 with the configuration of inlet and outlet ports as herein defined or described would be more efficient than the known bags and that improved uniform drying of the grain body 12 could be achieved.

What is claimed is:

1. A method of drying a body of grain, the method comprising:
    storing the body of grain in an elongate bag silo comprising at least one wall of an impermeable material, a first end and a second end;
    providing at least a first arrangement of ports for air in the bag, the first arrangement comprising:
        at least a first outlet for air from the bag, the first outlet being situated intermediate the first end and the second end of the bag;
        at least a first set of inlets for air into the bag, the first set of inlets being situated intermediate the first outlet and the first end of the bag, the first set of inlets comprising at least a first inlet which is spaced a first distance from the first outlet and a second inlet which is spaced a second distance from the first inlet and longitudinally further away from the first outlet than the first inlet, and wherein the first outlet is the closest outlet to the second inlet in a direction towards the second end of the bag; and
    providing a flow of air in the bag, between the at least first and second inlets and the first outlet, and utilizing a pressure regulating device at, at least some of the at least first and second inlets such that a pressure differential between any two of said at least first and second inlets is maintained within a predetermined threshold.

2. The method according to claim 1, wherein the pressure is maintained within the predetermined threshold by spacing the at least first and second inlets such that the magnitude of the first distance exceeds that of the second distance.

3. The method according to claim 2, wherein the first set of inlets further comprises a third inlet spaced a third distance from the second inlet and a fourth inlet spaced a fourth distance from the third inlet, and wherein the magnitude of the second distance exceeds that of the third distance, and the magnitude of the third distance exceeds that of the fourth distance.

4. The method according to claim 1, wherein the first set of inlets further comprises a third inlet spaced a third distance from the second inlet and a fourth inlet spaced a fourth distance from the third inlet, and wherein the pressure differential is maintained by spacing the inlets such that the magnitude of both the first and second distances are equal and the magnitude of both the third and fourth distances equals half of the magnitude of the both the first and second distances.

5. The method according to claim 1, wherein the first arrangement of ports for air in the bag further comprises a second set of inlets for air into the bag, the second set of inlets being a mirror image of the first set of inlets about a transverse line through the first outlet.

6. The method according to claim 1, wherein at least a second arrangement of ports is provided in the bag, the second arrangement being a duplicate of the first arrangement and being spaced intermediate the first arrangement and the second end of the bag.

7. The method according to claim 1, wherein each outlet comprises two laterally spaced outlet ports, each of said laterally spaced outlet ports being provided with a perforated outlet duct extending through the outlet port into the bag, and wherein each inlet comprises two laterally spaced inlet ports, each of said laterally spaced inlet ports being provided with a perforated inlet duct extending through the inlet port into the bag.

8. The method according to claim 1, wherein a flow of air is provided in the bag by providing an air pump in fluid flow communication with one of a) at least some of the inlets and b) at least some of the outlets.

9. A silo for drying a body of grain, the silo comprising:
an elongate bag comprising at least one wall of an impermeable material, a first end and a second end;
at least a first arrangement of ports for air in the bag, the first arrangement comprising:
at least a first outlet for air from the bag, the first outlet being situated intermediate the first end and the second end of the bag; and
at least a first set of inlets for air into the bag, the first set of inlets being situated intermediate the first outlet and the first end of the bag, the first set of inlets comprising at least a first inlet which is spaced a first distance from the first outlet and a second inlet which is spaced a second distance from the first inlet and longitudinally further away from the first outlet than the first inlet, at least some of the at least first and second inlets comprising a pressure regulating device and wherein the first outlet is the closest outlet to the second inlet in a direction towards the second end of the bag.

10. The silo according to claim 9, wherein the configuration of ports is such that when a flow of air is provided between the at least first and second inlets and the first outlet, a pressure differential between any of the said at least first and second inlets is maintained within a predetermined threshold.

11. The silo according to claim 9, wherein the at least first and second inlets are spaced such that the magnitude of the first distance exceeds that of the second distance.

12. The silo according to claim 9, wherein the first set of inlets further comprises a third inlet spaced a third distance from the second inlet and a fourth inlet spaced a fourth distance from the third inlet, and wherein the magnitude of the second distance exceeds that of the third distance, and the magnitude of the third distance exceeds that of the fourth distance.

13. The silo according to claim 9, wherein the first set of inlets further comprises a third inlet spaced a third distance from the second inlet and a fourth inlet spaced a fourth distance from the third inlet, and wherein the inlets are spaced such that the magnitude of both the first and second distances are equal and the magnitude of both the third and fourth distances equals half that of the magnitude of the first and second distances.

14. The silo according to claim 9, wherein the first arrangement of ports for air in the bag further comprises a second set of inlets for air into the bag, the second set of inlets being a mirror image of the first set of inlets about a transverse line through the first outlet.

15. The silo according to claim 9, wherein at least a second arrangement of ports is provided in the bag, the at least second arrangement being situated intermediate the first arrangement and the second end of the bag.

16. The silo according to claim 9, wherein each outlet comprises two laterally spaced outlet ports, each of said laterally spaced outlet ports being provided with a perforated outlet duct extending through the outlet port into the bag, and wherein each inlet comprises two laterally spaced inlet ports, each of said laterally spaced inlet ports being provided with a perforated inlet duct extending through the inlet port into the bag.

17. The silo according to claim 9, wherein each inlet comprises at least one of a solar heat collector, a heat exchanger and a heater energized by an electrical power source.

* * * * *